(12) United States Patent
Tominaga et al.

(10) Patent No.: US 6,880,000 B1
(45) Date of Patent: Apr. 12, 2005

(54) AUTOMATIC ADDRESS MANAGEMENT METHOD

(75) Inventors: Akihiro Tominaga, Tokyo (JP); Fumio Teraoka, Tokyo (JP); Jun Murai, Tokyo (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 09/611,159

(22) Filed: Jul. 6, 2000

(30) Foreign Application Priority Data

Jul. 8, 1999 (JP) .......................................... P11-194021

(51) Int. Cl.[7] .............................................. G06F 15/16
(52) U.S. Cl. .................................... 709/220; 709/221
(58) Field of Search ................................ 709/220, 221, 709/245; 370/348, 331, 338; 455/433

(56) References Cited

U.S. PATENT DOCUMENTS

| | | | | |
|---|---|---|---|---|
| 6,070,187 A | * | 5/2000 | Subramaniam et al. | 709/220 |
| 6,073,178 A | * | 6/2000 | Wong et al. | 709/229 |
| 6,408,339 B1 | * | 6/2002 | Wirkestrand | 709/245 |
| 6,427,174 B1 | * | 7/2002 | Sitaraman et al. | 709/245 |
| 6,469,998 B1 | * | 10/2002 | Burgaleta Salinas et al. | 370/338 |
| 6,515,974 B1 | * | 2/2003 | Inoue et al. | 370/331 |
| 6,549,776 B1 | * | 4/2003 | Joong | 455/433 |
| 6,578,074 B1 | * | 6/2003 | Bahlmann | 709/220 |
| 6,614,788 B1 | * | 9/2003 | Martin et al. | 370/392 |

OTHER PUBLICATIONS

Tominaga et al, "Problems and Solutions of DHCP", Proc. INET 1995.*
Droms, R., "Dynamic Host Configuration Protocol," Bucknell University, Mar. 1997, pp. 1–45.
Tominaga et al., "Problems and Solutions of DHCP," Proc. INET, 1995, pp. 1–10.
Thomon, S., "IPv6 Stateless Address Autoconfiguration," Bellcore, Aug. 1996, pp. 1–23.
Tominaga et al., "Dynamic Network Configuration Mechanism with Hierarchical Scheme," vol. 16, No.1 (1999), pp. 1–11.

* cited by examiner

*Primary Examiner*—John Follansbee
*Assistant Examiner*—Jungwon Chang
(74) *Attorney, Agent, or Firm*—Bell, Boyd & Lloyd

(57) ABSTRACT

In a system wide network of a hierarchical structure, address allocation is to be managed optimally the system-wide network has a core portion having a static connection pertinence and a terminal portion connected dynamically to the core portion. The upper order server allocates an address block to a lower order server, whilst the lower order server returns the address block to the upper order server. The address allocation in network addition is classed into address allocation phase in the network core portion and an address allocation phase in the network terminal portion. For completing a link for outside with respect to the system-wide network, a representative server acquires its own IP address. The representative server then requests allocation of an address block used in the network terminal portion to its directly higher order server and acquires the so-requested address block. The representative server then executes automatic address allocation processing using e.g., DNCP in the network terminal portion.

15 Claims, 14 Drawing Sheets

| version | op | xid |
|---|---|---|
| Message Digest ||| 
| subop | Metric | seq |
| src addr || Target addr |
| ID(type) | ID(length) | ID(body) |

FIG.9

| version | op | xid |
|---|---|---|
| Message Digest ||| 
| subop | flag | timer |
| addr ||| 
| mask ||| 
| src addr || Target addr |
| ID(type) | ID(length) | ID(body) |

FIG.10

| version | op | subop | flag |
|---------|-----|-------|------|
| Message Digest ||||
| timer ||||
| addr ||||
| mask ||||
| default router a ||||
| src addr | | Target addr ||
| ID(type) | ID(length) | ID(body) ||

FIG.11

AUTOMATIC ADDRESS MANAGEMENT METHOD

BACKGROUND OF THE INVENTION

1. Field of the Invention

This invention relates to an automatic address management technique for automatically allocating addresses used for discriminating respective hosts connected to a network. More particularly, it relates to an automatic address allocating technique for managing address allocation in a network in which a hierarchical structure is established and which is configured so that an upper order server will allocate an address to a lower order server.

More specifically, the present invention relates to a technique of automatic address allocation and recovery in a system-wide network of a hierarchical structure in which an upper order server allocates an address to a lower order server, wherein address management can be optimally supervised for events such as new connection (addition) or disconnection (deletion) of an external network to the system-wide network, change (migration) of a connecting point of the external network or change of an address in use (re-addressing).

2. Description of Related Art

Nowadays, technical researches into "network computing" of interconnecting computer systems by a network are proceeding briskly. The significance of interconnecting the computers over a network consists in co-owning of computer resources and information circulation and co-owning.

Among communication mediums interconnecting the computers, there are a LAN (Local Area Network) laid in a limited space such as an area within the precincts of enterprises or laboratories and WAN (Wide Area Network) interconnecting the LANs over a dedicated line. Recently, the "Internet", which is a giant global network, is being used extensively.

The "Internet" is a network having, as a prototype, the APPANET (Advanced Research Projects Agency Network) constructed by the US Department of Defence, and which subsequently is integrated into the NSFNET (National Science Foundation Network) of the US Foundation of Science. In 1995, the backbone part of the network was transferred to a civil organization to mark a starting point of the system-wide network of today. As a result of voluntary interconnection of servers (mainly UNIX workstations) installed in universities or research organizations, the Internet has developed into a global scale network, as the name of the Internet implies. At present, numerous servers are connected to the Internet and are laying open a variety of resource objects to numerous clients.

Meanwhile, addresses termed IP (Internet protocol) addresses have been introduced for uniquely representing hosts on the network distributed world-wide. An IP address is a 32-bit, that is 4-byte address proscribed in a "network layer" termed in an OSI (Open System Interconnection) reference model. The IP address is classified into a "global address" uniquely discriminated on the global scale Internet and a "private address" which is valid only in the private network such as a network laid in a specified enterprise. In the following, discussions are made mainly on the global address.

In the global scale Internet, the world-wide organization, termed IANA (Internet Assigned Numbers Authority), supervises IP global addresses and domain names. The IANA allocates address blocks to low order organizations territorially supervising the IP addresses or domain names, such as InterNIC (Network Information Center) of US, APNIC (Asia Pacific Network Information Center) in Asia-Pacific area or RIPE.NCC (Reseaux IP European network Coordination Centre). These territorial NICs split an allocated address block into a suitable size to allocated the split portion to NICs of respective nations, such as JPNIC. Each Internet service provider (ISP: Internet Service Provider), referred to below simply as a "provider", acquires an address block from the NIC of each nation belonging to an immediately upper order portion. Also, an enterprise or a university acquires an address block from a provider belonging to an immediately upper order portion to distribute an address block to each business site or laboratory belonging to its lower order portion.

FIG. 12 represents the relation among the servers on the Internet as a hierarchical structure from the standpoint of IP address management or allocation. An upper order server allocates an address block it owns to a lower order server, as described above. Address block allocation usually occurs on request from a lower order server. It should be noted that the relation between an upper order server and a lower order server, shown hierarchically in FIG. 12, does not necessarily mean a physical connection. Stated differently, the hierarchical structure shown in FIG. 12 represents the logical relation formed to meet a network management demand of address block allocation.

The IP address for uniquely discriminating hosts on the Internet is made up of a network address for designating a specified network (LAN) from the external network and a host address for specifying a particular computer connected in the sole network (LAN). The IP address, indispensable for Internet connection, is of a fixed length of 32 bits, such that there is a limit to the number of the IP addresses. Recently, as the number of servers is increasing rapidly, depletion of the IP addresses is thought to be impending.

On the other hand, the physical structure "of the Internet is perpetually changing. That is, the connection or disconnection to or from the network is occurring continually in some portions of the world or a route interconnecting the same points is changing dynamically with e.g., malfunctions of the physical links or routers. Of these changes, those pertinent to address management shown in FIG. 13 are classified into the following four types:

(1) new addition of a network (addition);

(2) removal of a network (deletion);

(3) migration of a network to another place (migration) and (4) change of network address (re-addressing).

These can be dealt with by two sorts of operations, namely address "allocation" and address "returing". For example, in "network addition", a required address block volume is estimated and allocated. The subject of allocation is determined depending on the scale or properties of the added network, such as Internet service providers (ISP) or a supervisor in an organization.

In "network deletion", the address so far used needs to be returned. The "network migration" corresponds to change of a provider or connection to another segment in the same provider. In the current Internet, if a provider is changed, it is necessary to request a new address block, and to return an old address, in order not to increase the route information uselessly.

In "re-addressing", an old address block is recovered and a new address block is allocated in its stead. The "re-addressing" is not necessarily accompanied by changes in the network structure. If, for example, a new address block is necessary due to an increased number of hosts in a network, neighboring address blocks are allocated so as not to increase the route information. If this is not possible, re-addressing is performed. Such re-addressing also becomes necessary in order to adjust the address space which has become sub-divided due to repeated address allocation and retuning.

The Internet is a giant network developed to a global scale, with the structure or the scale of the network or the number of connected computers changing drastically. Notwithstanding, the above-mentioned operations for address allocation are performed by a manual operation. The result is that dynamic changes taking place in every area of the world cannot be coped with, whilst the finite addresses are being used only wastefully, that is, the management efficiency of the Internet is not that high.

Recently, an automatic IP address allocation mechanism, such as "Dynamic Host Configuration Protocol (DHCP)"/*/ or IPv6 Auto Configuration/**/, has been developed.

Of these DHCP is targeted at automating a manual operation required for network construction, and is implemented by installing at least one DHCP server on the network.

In the DHCP server, the necessary information, such as range of the IP network addresses or sub-net mask, is first entered. A client in need of acquiring an IP address first broadcasts a packet (DHCPDISCOVER) for confirming whether or not the DHCP in server is present on the network. On detection of the DHCPDISCOVER packet, the DHCP server broadcasts a responding packet (DHCPOFFER).

The client then is responsive to DHCPOFFER to broadcast an IP address request packet (DHPCREQUEST). The DHCP server determines the IP address and broadcasts the IP address and the sub-net mask (DHCPACK). The client receives the DHCPACK packet to complete acquisition of its own IP address. The DHPC server appends limitations on the lease period of the IP address and allows the client to acquire the IP address again to smooth the re-utilization of the IP address. The IPv6 is a protocol negotiated and standardized by IETF (Internet Engineering Task Force) with a view mainly towards expanding the address space and reducing the routing load.

In IPv6, the Prefix corresponding to the IP network address and the EUI corresponding to the MAC (Media Access Control) address owned inherently by each host are combined together to generate an IPv6 address to realize the function of automatically generating globally unique addresses. By this function, the network user is freed of labor-consuming addressing operations. However, this automatic address setting can be used only in a sole segment, which is a network unit, e.g., a portion from the trailing and to a trailing end of a coaxial cable if the LAN is constructed by this coaxial cable.

These two automatic address allocation mechanisms are targeted at a sole host such that it cannot be applied to network-based automatic address allocation. That is, these automatic address allocation mechanisms lack in scalability.

The present inventors have already proposed a technique termed "Dynamic Network Configuration Protocol (DNCP) "/***/ which has realized the network-based automatic address allocation.

The DNCP first constructs a hierarchical tree structure (spanning tree shown in FIG. 14b), based on a network topology having the physical connection established among respective hosts as shown in FIG. 14a, and performs address allocation in accordance with the tree structure. The scalability can be kept at a higher value by handling the network as a hierarchical model.

FIG. 15 schematically illustrates the address allocation system by DNCP. First, a tree structure among respective servers is formed in accordance with a network topology. In the example shown in FIG. 15, there are two servers S1, S2 as directly lower order servers of a route server RS, whilst there are two servers S3 and S4 as lower order servers with respect to the server S1. Referring to FIG. 15b, the address block initially allocated to the route server RS are suitably split and allocated to the route server RS itself and lower order servers, shown shaded and dotted in FIG. 15b, respectively. The route server RS pools the address block left to itself. Since there is no server as a lower order server to the server S2, that is, there is no server to which to allocate the address, the server S2 also pools the allocated address block. Conversely, since there are servers S3 and S4 as lower order servers to the server S1, the address block needs to be allocated recursively. That is, the address block allocated to the server S1 is suitably split and allocated to the server S1 itself, shown shaded in FIG. 15b, and to the lower order servers S3 and S4, shown dotted in FIG. 15b. The server S1 pools the address block allocated thereto. Similarly, the servers S3 and S4 pool the address block allocated thereto, as shown shaded in FIG. 15b.

That is, according to DNCP, an upper order server sequentially splits an address block and allocates the split address block to the lower order servers to realize efficient automatic address allocation.

In a network of a smaller scale, its physical structure can be grasped as a static structure. If the structure is dynamic, all changes can be grasped, so that application of DNCP is possible. On the other hand, in the system-wide network, such as Internet, network connection and disconnection occur perpetually somewhere the world, with the physical network structure changing perpetually. The fact that the physical network structure is changing dynamically means that the tree structure for address allocation is also changed. Therefore, the DNCP cannot be directly applied to the global scale network management. That is, the DNCP lacks in scalability.

Annotations

*: As for DHCP, it is disclosed in R. Droms, "Dynamic Host Configuration Protocol" (RFC 2131, March 1997) and in Tominaga, Teraoka and Murai "Problems and Solutions of DHCP" (Proceedings of INET 1995, vol.1, pp.481 to 490, June 1995). The DHCP is defined in RFC (Request for Comments) 1533, 1534, 1541 and 1542. The protocol itself covers application and presentation layers of OSI (Open Systems Interconnection).

**: Pv6 Auto Configuration is described e.g., in A Thomson and T. narten, IPv6 Stateless Address Auto-configuration (RFC 1971 August 1996).

***: DNCP is described e.g., in a treatise by Tominaga, Teraoka and Murai entitled "Dynamic Network Setting Mechanism Employing a Hierarchical Structure" (Computer Software, January 1999, Journal of Japan Society of Software Science, January 1999).

SUMMARY OF THE INVENTION

It is therefore an object of the present invention to provide an automatic address allocation and a management technique whereby an address for discriminating respective hosts connected to the network can be allocated automatically.

It is another object of the present invention to provide an automatic address allocation and a management technique for a network of a hierarchical structure in which an upper order server allocates an address to a lower order server, whereby address allocation can be managed optimally.

It is yet another object of the present invention to provide an automatic address allocation and management technique for a network of a hierarchical structure in which an upper order server allocates an address to a lower order server, whereby address allocation can be managed optimally for events such as new connection (addition) or disconnection (deletion) of an external network to the system-wide network, change (migration) of a connecting point of the external network or change of an address in use (re-addressing).

The present invention provides, in its one aspect, an automatic address management method in a system-wide network made up of a core portion with fixed addresses having a static already allocated interconnection and a terminal portion with indefinite addresses, dynamically connected to the core portion, in which an upper-lower order relation is established such that an upper order server allocates an address block to a lower order server and the lower order server returns the address block to the upper order server, wherein, when the terminal portion is to be connected to the core portion, the method includes (a) a step in which a representative server with a link to outside contained in the terminal portion attempts to be connected to a segment contained in the core portion;
(b) a step in which the representative server requests allocation of an address block to an upper order server supervising the segment; and
(c) a step in which the representative server distributes an address block in the terminal portion.

In the automatic address management method according to claim 1 wherein, the first aspect, the representative server in the step (a) may request connection using an already known address owned by an upper order server of the segment.

In the step (a), the representative server may requests acquisition of its own IP address.

In the step (a), an address may automatically be allocated to the representative server in accordance with DHCP (Dynamic Host Configuration Protocol) or IPCP (Internet protocol Control Protocol).

If in the step (b), an upper order server receiving an address block allocation request does not own a sufficient address pool, an address block allocation request may be recursively issued to a further upper order server.

In the step (c), an address block may be distributed to each server in the terminal portion in accordance with DNCP (Dynamic Network Configuration Protocol).

The present invention also provides, in its second aspect, a router in a system-wide network made up of a core portion with fixed addresses, having a static already allocated interconnection and a terminal portion with indefinite addresses, dynamically connected to the core portion, in which an upper-lower order relation is established such that an upper order server allocates an address block to a lower order server and the lower order server returns the address block to the upper order server, wherein the router functions as a representative server having a link for outside for the terminal portion, and includes (a) connection means in which a representative server with a link to outside contained in the terminal portion attempts to be connected to a segment contained in the core portion;
(b) address acquisition means in which the representative server requests allocation of an address block to an upper order server supervising the segment; and
(c) address distribution means in which the representative server distributes an address block in the terminal portion.

In the router according to the second aspect of the present invention, the connection means (a) may request connection using an already known address owned by an upper order server of the segment.

The connection means (a) may request acquisition of an IP address of the representative server itself.

The connection means (a) may have an address of the representative server automatically allocated in accordance with DHCP (Dynamic Host Configuration Protocol) or IPCP (Internet protocol Control Protocol).

If an upper order server receiving an address block allocation request from the address acquisition means (b) does not own a sufficient address pool, an address block allocation request may recursively be issued to a further upper order server.

The address distribution means (c) may distribute an address block to each server in the terminal portion in accordance with DNCP (Dynamic Network Configuration Protocol).

The present invention also provides, in its third aspect, a program furnishing medium for furnishing a computer program in a tangible and computer-readable form, the computer program being such a program by means of which a computer system connected to a system-wide network made up of a core portion with fixed addresses having an already allocated static interconnection and a terminal portion with indefinite addresses dynamically connected to the core portion, in which an upper-lower order relation is established such that an upper order server allocates an address block to a lower order server and the lower order server returns the address block to the upper order server, operates as a router, wherein, for assuring automatic address management when the terminal portion is to be connected to the core portion, the computer program includes (a) a step in which a representative server with a link to outside contained in the terminal portion attempts to be connected to a segment contained in the core portion;
(b) a step in which the representative server requests allocation of an address block to an upper order server supervising the segment; and
(c) a step in which the representative server distributes an address block in the terminal portion.

In the program furnishing medium according to the third aspect of the present invention, the representative server in the step (a) may request connection using an already known address owned by an upper order server of the segment.

In the step (a), the representative server may request acquisition of its own IP address.

In the step (a), an address may automatically be allocated to the representative server in accordance with DHCP (Dynamic Host Configuration Protocol) or IPCP (Internet protocol Control Protocol).

If, in the step (b), an upper order server receiving an address block allocation request does not own a sufficient address pool, an address block allocation request may recursively be issued to a further upper order server.

In the step (c), an address block may be distributed to each server in the terminal portion in accordance with DNCP (Dynamic Network Configuration Protocol).

The present invention also provides, in its fourth aspect, program transmitting signal for transmitting a computer over a wire or a radio path, the computer program being such a program by means of which a computer system connected to a system-wide network made up of a core portion with fixed addresses having a static already allocated interconnection and a terminal portion with indefinite addresses dynamically connected to the core portion, in which an upper-lower order relation is established such that an upper order server allocates an address block to a lower order server and the lower order server returns the address block to the upper order server, operates as a router, wherein, for assuring automatic address management when the terminal portion is to be connected to the core portion, the program transmitting signal includes (a) a step in which a representative server with a link to outside contained in the terminal portion attempts to be connected to a segment contained in the core portion;

(b) a step in which the representative server requests allocation of an address block to an upper order server supervising the segment; and (c) a step in which the representative server distributes an address block in the terminal portion.

In the program transmitting signal according to the fourth aspect of the present invention, the representative server in the step (a) may request connection using an already known address owned by an upper order server of the segment.

In the program transmitting signal according to the fourth aspect of the present invention, the representative server in the step (a) may request acquisition of its own IP address.

In the step (a), an address may be automatically allocated to the representative server in accordance with DHCP (Dynamic Host Configuration Protocol) or IPCP (Internet protocol Control Protocol).

If, in the step (b), an upper order server receiving an address block allocation request does not own a sufficient address pool, an address block allocation request may be recursively issued to a further upper order server.

In the step (c), an address block may be distributed to each server in the terminal portion in accordance with, DNCP (Dynamic Network Configuration Protocol).

The system-wide network, to which the present invention is applied, is made up of a core portion with fixed addresses having an already allocated static interconnection and a terminal portion with indefinite addresses dynamically connected to the core portion. On the system-wide network, an upper-lower order relation is established among servers such that an upper order server allocates an address block to a lower order server and the lower order server returns the address block to the upper order server.

The address allocation on network addition comprises an address allocation phase int the core portion of the network and an address allocation phase int the core portion of the network. As a presupposition for initiating the address allocation phase in the core portion, an address of an upper order server on a segment as a destination of connection, that is the IP address, is to be notified to the representative server. If the destination of connection is a segment connected by one or more routers, as lower order server(s) for the upper order server, the IP address on the router on the segment needs to be notified to the representative server.

For outside linking to the system-wide network, a representative server acquires its own IP address. The representative server registers its own IP address as an identifier for a directly upper order sever, that is for the upper order server on the segment, as the destination of connection. If the destination of connection is a segment connected by one or more routers, set as a lower order server for the upper order server, the representative server registers its own IP address on the routers on this segment.

The IP address, allocated to the representative server, may be set manually or automatically in the core portion of the system-wide network. An example of setting the IP address automatically is the above-mentioned DHCP. Another example of automatic setting is the IPCP (Internet Protocol Control Protocol).

The representative server requests allocation of an address block used in a network management unit managed by itself, in the terminal portion of the network, to an upper order server directly above the representative server.

If the upper order server, which has received the allocation request message, owns a sufficient address pool, it allocates an address block to the representative server to complete the address block allocation processing in the core portion of the system-wide network. If the address pool owned by the upper order server is not enough, it suffices if the upper order server recursively requests address block allocation to further upper order servers.

If the representative server has acquired an address block through a link for outside, address allocation in the terminal portion, that is in the network management unit, then is carried out.

In a small-scale network management unit, an address can be automatically allocated to each host in the unit by applying e.g., DNCP (Dynamic Network Configuration Protocol). That is, the upper order server is able to sequentially split the address block to allocate an address to a lower order server to realize efficient automatic address allocation.

The program furnishing medium in the third aspect of the present invention is a medium furnishing a computer program in a tangible and computer-readable form to a general-purpose computer system capable of executing a variety of program codes. There is no limitation to the medium used, such that a removable portable recording medium, such as a CD (Compact Disc), FD (Floppy Disc) or MO (magneto-optical disc), or a transmission medium, such as wired or radio transmission medium, may be used the program transmission signal in the fourth aspect of the present invention is a signal which is a program code that can be executed on the general-purpose computer system and that has been converted to a form enabling transmission over a cable or a radio route.

The program furnishing medium or the transmission signal represents the definition of the relationship of the structural or functional cooperation between the computer program and the furnishing medium or the transmission signal for realization of a pre-set computer program function on the computer system. Stated differently, by installing a pre-set computer program on a computer system through the program furnishing medium according to the third aspect or the transmission signal according to the fourth aspect, there is displayed a cooperative relationship on the computer system to achieve the same operation and result as that of the first aspect of the invention.

In this manner, the present invention provides an automatic address allocation and management technique whereby an address for discriminating each host connected to the network can be allocated automatically.

Moreover, the present invention provides a technique of automatic address allocation and recovery in a system-wide network of a hierarchical structure in which an upper order server allocates an address to a lower order server, wherein address management can be optimally supervised for events such as new connection (addition) or disconnection (deletion) of an external network to the system-wide network, change (migration) of a connecting point of the external network or cahnge of an address in use (re-addressing).

Other objects and advantages of the present invention will become apparent from the following description which is made with reference to the accompanying drawings.

BRIEF DESCRIPTION OF THE DRAWINGS

FIG. 9 illustrates a data structure of a message used in a server tree constructing function and having added thereto a 16-octet field for setting authentication data, with the message being used for a terminal portions.

FIG. 10 illustrates a data structure of a message used in a network setting function and having added thereto a 16-octet field for setting authentication data, with the message being used for a terminal portions.

FIG. 11 illustrates a data structure of a message used in a host setting function and having added thereto a 16-octet field for setting authentication data, with the message being used for a terminal portions.

DESCRIPTION OF THE PREFERRED EMBODIMENTS

Figure 1:
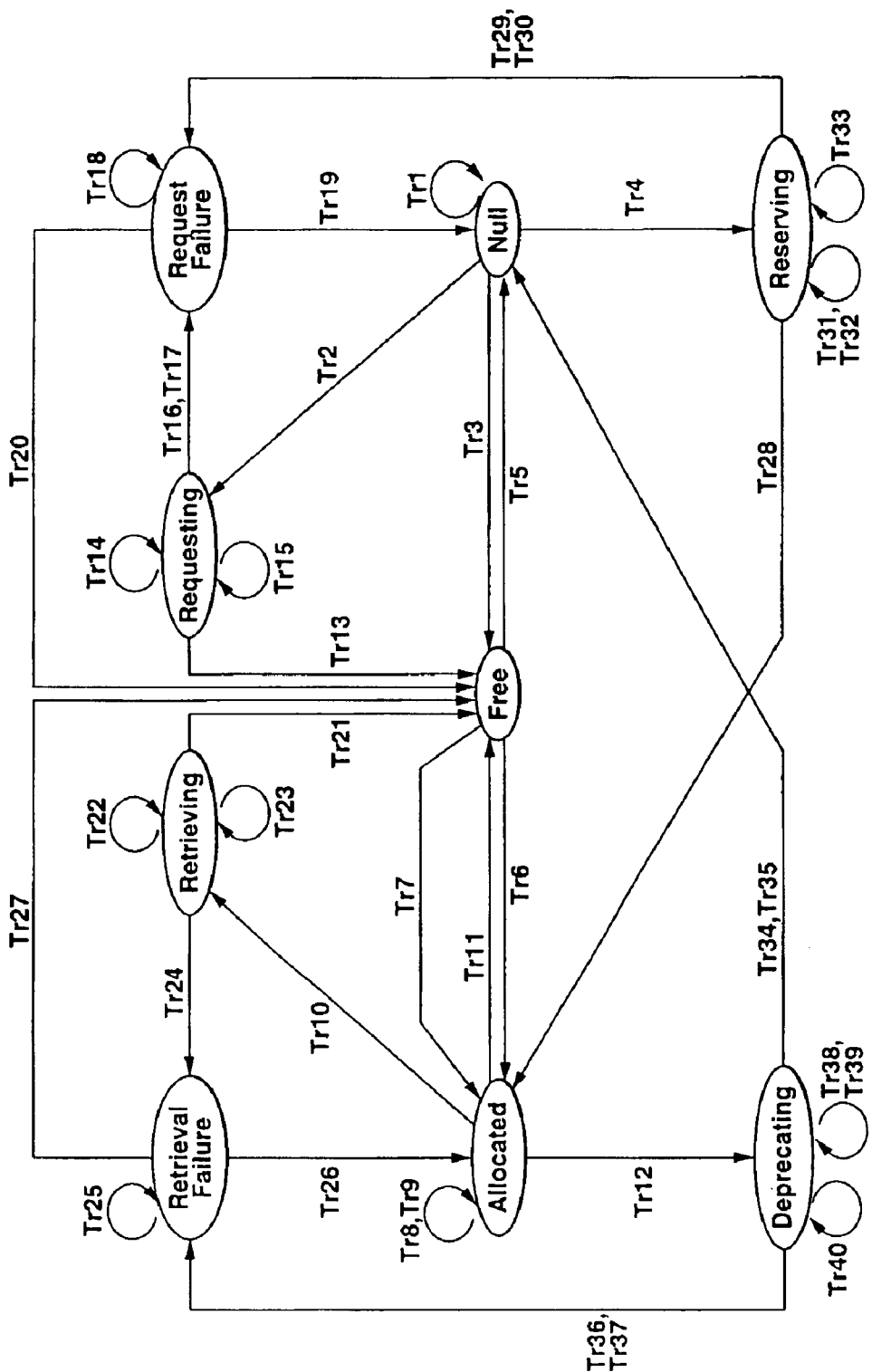
FIG. 1 shows status transition of address blocks according to the present invention.

Referring to the drawings, preferred embodiments of the present invention will be explained in detail.

It is assumed that the network contemplated in the present embodiment is a so called "client server" type model. The respective segments making up the network, that is network units, for example, the network portions from the trailing end to the trailing end if LAN is constructed by a coaxial cable, are interconnected by routers. In the present embodiment, the entire routers on the network operate as servers. The clients are assumed to be operated in a computer (host computer) other than the routers on the network. The servers are inter-related by upper order/lower order pertinence insofar as the address allocation is concerned.

Figure 13:
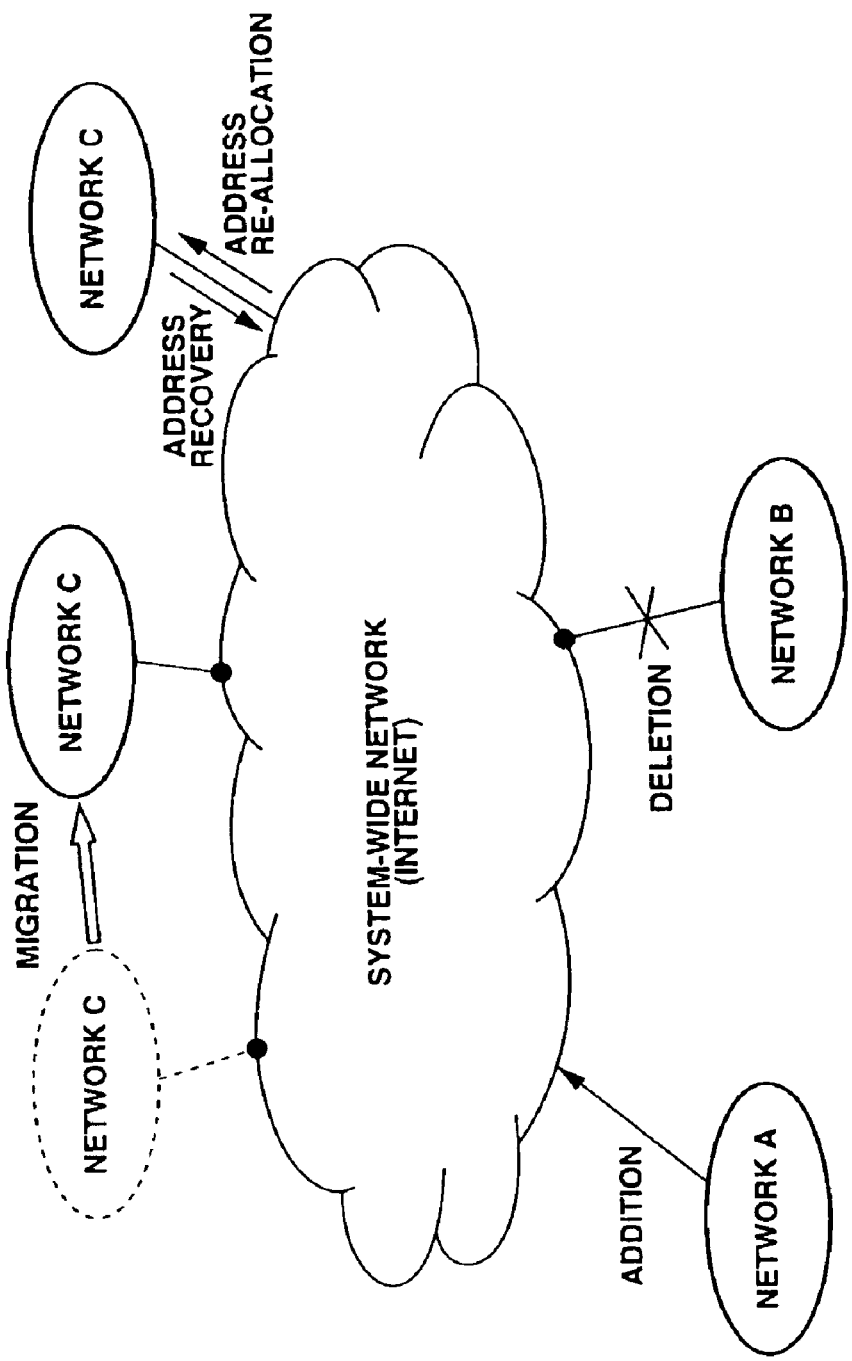
FIG. 13 illustrates changes in a physical structure produced on the Internet.
Figure 14B:
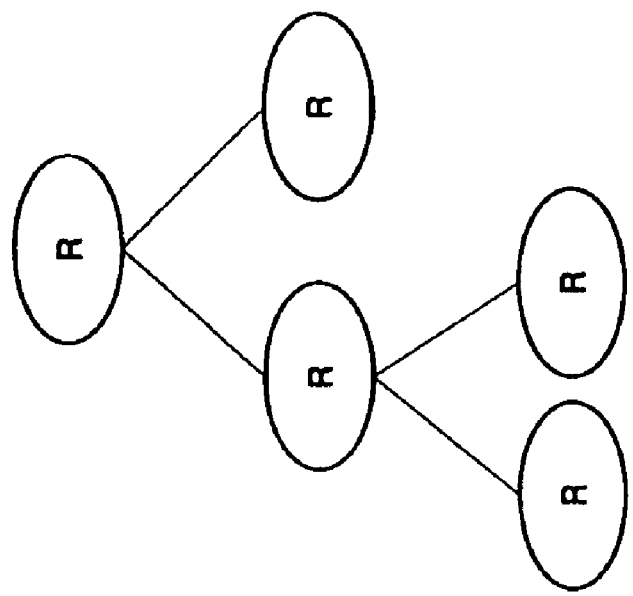
FIGS. 14a and 14b illustrate how addresses are allocated in accordance with DNCP (dynamic network control protocol), with FIG. 14a showing the physical connection on a network and FIG. 14b showing a tree structure formed based on a network topology.
Figure 14A:
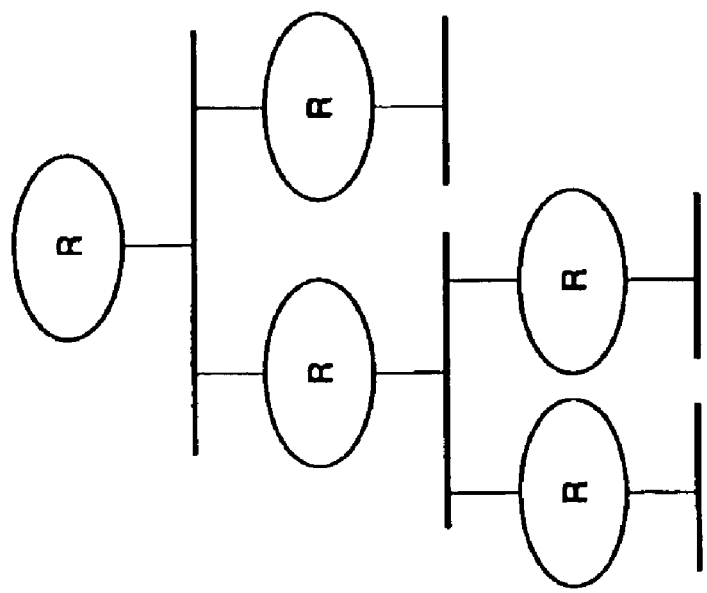
Figure 15B:
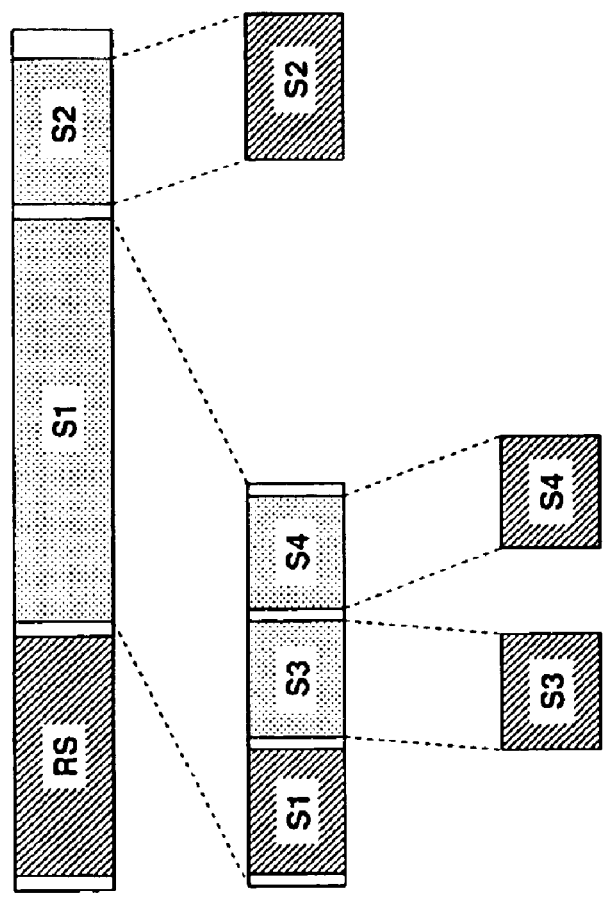
FIGS. 15a and 15b schematically show how addresses are allocated by DNCP in accordance with a tree structure among respective servers constructed in accordance with the network topology, with FIG. 15a showing a tree structure among respective servers formed in accordance with the network topology and FIG. 15b showing how address blocks are sequentially allocated to the respective servers.
Figure 15A:
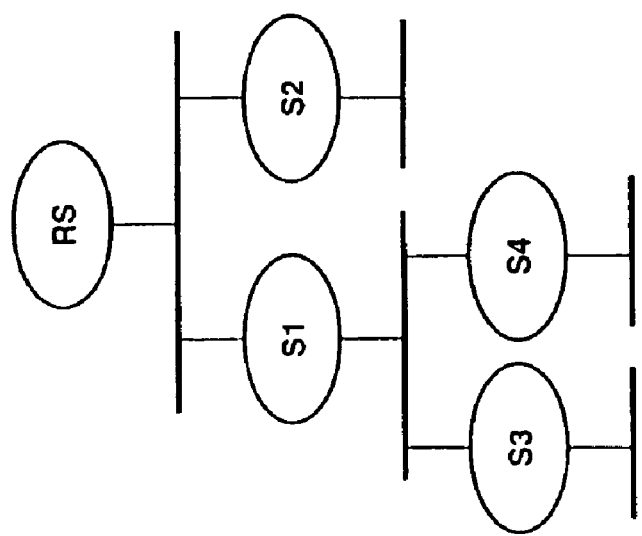

In the present embodiment, it is assumed that, if a system-wide network, such as Internet, is changed from a given pre-existing state k to another state k+1, address administration corresponding to this change is performed automatically on the global scale. The pre-existing state k means such a state in which IANA, NIC of each territory, MIC of each nation and a large number of providers in the lower order thereto already exist on the Internet and in which the IP addresses and address blocks are already distributed to the respective servers pre-existing on the Internet. Meanwhile, "changes" on the Internet designate addition, deletion or migration of networks and re-addressing (see the above explanation and FIG. 13).

The circumstances in which the Internst must be re-booted from the zero state, that is the completely initialized state, are presumed not to occur in future, the above supposition is felt to be valid.

On the other hand, the system-wide network, such as Internet, is classified into a static portion in which the physical and/or logical interconnection is fixed and is scarcely changed, and a dynamically changing portion in which events such as connection or disconnection occurs frequently such that the physical and/or logical interconnection is changed dynamically.

The former portion, that is the static network portion, corresponds to the NIC (network information center) of each nation or its upper order portions, that is territorial NIC or IANA (Internet Assigned Numbers Authority), and is termed herein the "core" of the network. In the core portion, the connected state to the Internet is fixed and invariable, such that respective hosts can identify one another by the already assigned IP addresses.

The latter portion, that is the dynamic network portion, corresponds to the providers (ISP) to which addresses of the IP address blocks are allocated by the NIC, and to organizations, such as universities or companies, which are the lower-order portions with respect thereto. This dynamic network portion is herein termed a "terminal" of the network. The terminal portion inherently has no own IP address, so that, if an attempt is made to establish Internet connection newly, communication by the IP address is not possible.

As already discussed in "description of the related art", the IP address allocation basically occurs by the upper order server allocating address blocks to the lower order server. The lower order server is also able to transfer address management to the upper order server.

The automatic management of address blocks in the present invention is hereinafter explained. FIG. 1 illustrates the address block status transition in accordance with the present invention. As shown in FIG. 1, the address block is able to assume nine states of "Null", "Free" "Allocated", "Requesting", "Request Failure", "Retreving", "Retrevial Failure", "Reserving" and "Deprecating". In the present embodiment, messages shown in the following Table 1 are defined for automatic; address block management:

TABLE 1

| appellations | usage |
| --- | --- |
| AlloRequest | address allocation request from a lower order server to an upper order server |
| ReleaseRequest | address return request from an upper order server to a lower order server |
| Alloc | address allocation request from an upper order server to a lower order server |
| Release | address return from a lower order server to an upper order server |
| AllocReqNack | refusal of AlloqRequest from a lower order server |
| ReleaseReqNack | refusal of ReleaseRequest from an upper order server |
| AllocReqAck | AllocRequest is received by an upper order server which returns an acknowledgement response that it is being processed (the receiving lower-order server re-sends AlloqRequest after lapse of a pre-set time) |
| ReleaseReqAck | ReleaseRequest is received by an lower order server which returns an acknowledgement response that it is being processed (the receiving upper-order server re-sends ReleaseRequest after lapse of a pre-set time |
| Migrate | advance network migration request from a lower order server to an upper order server |
| MigrateAck | acknowledgement response to Migrate from an upper order server |

The automatic address management system of the present embodiment operates based on the two basic operations, namely address block allocation from the upper order server to the lower order server and return of the address block from the lower order server to the upper order server. In the address allocation/return transactions, employing messages shown in Table 1, the requesting host requesting allocation or return is to be responsible for message re-sending. In the following, description is made with reference to FIG. 1.

1. Null State

The "Null" is an initial state of an address block, with the rights to supervise it being in another server.

If, in this Null state, a ReleaseRequest is received from the upper order server, a Release is sent to the upper order server to return the address block, as a result of which the address block is maintained in the Null state (Tr1).

If, in an own server, addresses fall in shortage, it sends AllocRequeat to the upper order server to request allocation of an address block. As a result, the address block transfers to a requesting state, as explained subsequently (Tr2). If Alloc is received from the upper order server so that the own server has an address block allocated thereto, this address block transfers to a Free state (Tr3).

If AllocRequest is received from the lower order server, the own server sends AllocReqAck to the lower order server to make acknowledgement response. If an address pool in the own server is in shortage, the own server issues AllocRequest to the upper order server to request address block allocation. In this case, the address block transfers to the Reserving state, as explained subsequently (Tr4).

TABLE 2

| event | processing contents | next state |
| --- | --- | --- |
| own server receives ReleaseRequest from upper order server | own server sends Release to the upper order server | Null state |
| addresses are in shortage in own server | own server sends AllocRequest to upper order server | Requesting state |
| own server receives Alloc from upper order server | none | Free state |
| own server receives | own server sends | Reserving state |

TABLE 2-continued

| event | processing contents | next state |
| --- | --- | --- |
| AllocRequest from lower order server | AlloqReqAck to send AllocRequest to upper order server | |

2. Free State

The "Free" is a state of an address block not allocated to a lower order server nor to a client. That is, an address block in a Free state is pooled in the own server.

If, in this Free state, a ReleaseRequest is received from the upper order server, the own server sends Release to the upper order server to return the address block. As a result, the address block transfers to the Null state (Tr5).

If the own server receives AllocRequest from the lower order server, it sends Alloc to the lower order server to allocate an address block thereto. As a result, the address block transfers to an Allocated state, as explained subsequently (Tr6).

If IP addresses fall into shortage in a sub-net being supervised, IP address allocation to a client set is started so that an address block state transfers to an Allocated state, as explained subsequently (Tr7).

TABLE 3

| event | processing contents | next state |
| --- | --- | --- |
| own server receives ReleaseRequest from upper order server | own server sends Release to upper order server | Null state |
| own server receives AllocRequest from lower order server | own server sends Alloc to lower order server | Allocated state |
| IP addresses are in shortage in a sub-net being supervised | own server starts allocating IP addresses to a client set | Allocated state |

3. Allocated State

The "Allocated" is a state of an address block the rights of supervision of which have been transferred to the lower order server, or a state of an address block used for IP address allocation to each individual client.

If, in this Allocated state, the own server receives AllocRequest from the lower order server which has entrusted its supervision, the own server sends Alloc to the lower order server to allocate the address block thereto. As a result, the address block is kept in its Allocated state (Tr8).

If the own server receives AllocRequest from other than the lower order server which has entrusted its supervision, the own server sends AllocReqNack to the requesting server to refuse address block allocation. In this case, the address block is kept in its Allocated state (Tr9).

If addresses are in surplus state in the lower order server, the own server sends ReleaseRequest to the lower order server to request return of an address block. As a result, the address block transfers to a Retrieving state, as later explained (Tr10).

If the own server receives Release from the lower order server, and the address block is returned, this address block transfers to a Free state, as later explained (Tr11). If the own server receives ReleaseReqAck from the upper order server, it sends ReleaseReqAck to the requesting upper order server to make acknowledgement response. If the address block requested to be returned is an address block already entrusted to the lower order server, the own server sends ReleaseRequest to the lower order server. If the address block requested to be returned is the address block allocated to the client, the own server starts to recover the IP address. In any of these cases, the address block transfers to a Deprecating state, as later explained (Tr12).

TABLE 4

| event | processing contents | next state |
| --- | --- | --- |
| own server receives AllocRequest from lower order server which entrusted management | own server sends Alloc to lower order server | Allocated state |
| own server receives AllocRequest from other than lower order server which entrusted management | own server sends AllocReqNack to requesting server | Allocated state |
| addresses are in surplus in lower order server | own server sends ReleaseRequest to lower order server | Retrieving state |
| own server receives addresses from lower order server | none | Free state |
| own server receives ReleaseRequest from upper order server | own server sends ReleaseReqAck to upper order server and sends ReleaseRequest to the lower order server or starts recovery of IP addresses if the address block is one entrusted to lower order server or if the address block is one allocated to client, respectively | Deprecating state |

4. Requesting State

An address block requesting allocation to an upper order server is in the requesting state.

If, in this Requesting state of an address block, the own server receives Alloc from the upper order server, the rights of supervision of this address block are transferred to the upper order server. As a result, the address block transfers to the Free state (Tr13).

On the other hand, if the own server receives AllocReqAck from the upper order server, the own server re-sends AllocRequest to the upper order server after lapse of a pre-set time. The address block is kept in its Requesting state (Tr14). After lapse of a further pre-set time, the own server re-sends AllocRequest to the upper order server. The address block is kept in its Requesting state (Tr15).

If, after lapse of a pre-set time as from re-transmission of AllocRequest N times, or if AllocReqNack is received from the upper order server, so that the address block allocation request has resulted in a failure, the address block transfers to the Request Failure state, as later explained (Tr16 and Tr17). Meanwhile, the setting of the number of times of re-transmission N can be changed.

TABLE 5

| event | processing contents | next state |
| --- | --- | --- |
| own server receives Alloc from upper order server | none | Free state |
| own server receives AllocReqAck from upper order server | re-sends AllocRequest to upper order server after lapse of a pre-set time | Requesting state |
| pre-set time elapses | re-sends AllocRequest to upper order server | Requesting state |
| pre-set time elapses after resending AllocRequest N times | none | Requesting Failure state |
| own server receives AllocReqNack from upper order server | none | Requesting Failure state |

5. Request Failure State

The "Request Failure" corresponds to the state of an address block in which allocation is refused by AllocReqNack such that re-sending of an allocation request is inhibited for a pre-set time.

If, in this Requesting Failure state of the address block, the own server receives AllocRequest from the lower order server, the own server sends AllocReqNack to the lower order server. As a result, the address block is kept in its Requesting Failure state (Tr18).

If a pre-set time elapses in this state, the address block transfers to the Null state (Tr19).

On the other hand, if the own server receives Alloc from the upper order server, so that it has an address block allocated to it, the address block transfers to the Free state (Tr20).

TABLE 6

| event | processing contents | next state |
| --- | --- | --- |
| own server receives AllocRequest from lower order server | own server sends AllocReqNack to lower order server | Request Failure state |
| pre-set time elapses | none | Null state |
| own server receives Alloc from upper order server | none | Free state |

6. Retrieving State

An address block which has sent ReleaseRequest to a lower order server such that an address block is requested to be returned, the address block is in the Retrieving state.

If, with the address block in the Retrieving state, the own server receives Release from a lower order server and returns the address block, the address block transfers to the Free state (Tr21).

If the own server receives ReleaseReqAck from the lower order server, the own server sends ReleaseRequest to the lower order server after lapse of a pre-set time. The address block is kept in its Retrieving state (Tr22).

If the Retrieving state continues for longer than a pre-set time, returning of the address block is deemed to have failed, such that the address block transfers to the Retrieval Failure state, as later explained (Tr23). Also, if the own server receives ReleaseReqNack from the lower order server, such that returning of the address block is refused, returning of the address block is deemed to have failed, such that the address block transfers to the Retrieval Failure state (Tr24).

TABLE 7

| event | processing contents | next state |
| --- | --- | --- |
| own server receives Release from lower order server | none | Free state |
| own server receives ReleaseReqAck from lower order server | own server sends ReleaseRequest to lower order server after lapse of pre-set time | Retrieving state |
| pre-set time elapses | own server re-sends ReleaseRequest to lower order server | Retrieving state |
| pre-set time elapses after resending ReleaseRequest N times | none | Retrieving Failure state |
| own server receives ReleaseReqNack from upper order server | none | Retrieving Failure state |

7. Retrieval Failure State

An address block, the returning of which responsive to the address returning request is refused by the lower order server by ReleaseReqNack, is in the Retrieval Failure state. If the address transfers to this state, re-sending of the return request message Release is inhibited until a pre-set time elapses.

If, in this Retrieval Failure state, the own server receives ReleaseRequest from the upper order server, the own server sends ReleaseRequestNack to the upper order server to refuse returning of the address block, with the address block being kept in its Retrieval Failure state (Tr25).

If a pre-set time elapses in this state, the address block transfers to the Allocated state so that the right to supervise the address block is entrusted to a lower order server.

On the other hand, Release is received from the lower order server so that the address block transfers to the Free state (Tr27).

TABLE 8

| event | processing contents | next state |
|---|---|---|
| own server receives ReleaseRequest from upper order server | own server sends ReleaseReqNack to upper order server | Retrieval Failure state |
| after lapse of pre-set time | none | Allocated state |
| own server receives Release from lower order server | none | Free state |

8. Reserving State

Reserving is such a state of an address block in which an own server receives an address allocation request AllocRequest from a lower order server and in which the own server is requesting allocation to an upper order server. When the address block is received from the upper order server, the own server proceeds immediately to allocation processing for the lower order server.

If, in the Reserving state, the own server receives Alloc from the upper order server, the own server sends Alloc to the lower order server to allocate an address block thereto. As a result, the address block transfers to the Allocated state (Tr28).

If AllocReqNack is received from the upper order server such that allocation of the address block is refused, the own server sends AllocReqNack to the lower order server to refuse allocation. So, the address block transfers to transfers to the RequestFailure state (Tr29). Also, if the reserving state persists for longer than a pre-set time, the own server sends AllocReqNack to the lower order server to refuse allocation so that the address block transfers to the RequestFailure state (Tr30).

If the own server receives AllocRequest from the same lower order server as before, the own server returns AllocReqAck to this lower order server by way an acknowledgement response, at the same time as the own server sends AllocRequest to the upper order server to request allocation of an address block, with the address block keeping its Reserving state (Tr31). If the own server receives AllocRequest from a lower order server different from the lower order server from which AllocRequest was previously received, the own server returns AllocReqNack to this lower order server to refuse allocation of an address block, with the address block keeping its Reserving state (Tr32).

If AllocReqNack is received from the upper order server, such that allocation of an address block is refused, the timer setting is elongated, with the address block keeping its Reserving state (Tr33).

TABLE 9

| event | processing contents | next state |
|---|---|---|
| own server receives Alloc from upper order server | sends Alloc to lower order server | Allocated state |

TABLE 9-continued

| event | processing contents | next state |
|---|---|---|
| own server receives AllocReqNack from upper order server | own server sends AllocReqNack to lower order server | Request Failure state |
| after lapse of pre-set time | own server sends AllocReqNack to lower order server | Request Failure state |
| own server receives AllocRequest from the same lower order server as before | own server sends AllocReqNack to lower order server and sends AllocRequest to upper order server | Reserving state |
| own server receives AllocRequest from a different lower order server | own server sends AllocReqNack to lower order server | Reserving state |
| own server receives AllocReqAck from the lower order server | elongates timer setting | Reserving state |

9. Deprecating State

The "Deprecating" is such a state of an address block in which an own server receives an address return request from an upper order server and in which an address return request is sent to the lower order server. When the address block is returned from the lower order server, the own server proceeds immediately to return the address block to the upper order server.

If, in this Deprecating state, the own server receives Release from the lower order server and gets an address block returned, it immediately sends Release to the upper order server to return the address block. As a result, the address block transfers to the Null state (Tr34). Similarly, when recovery of an IP address from a client set is completed, the own server immediately sends Release to the upper order server and returns the address block, with the address block then transferring to the Null state (Tr35).

If, in this state, the own server receives ReleaseReqNack from the lower order server such that returning of the address block is refused, the own server sends ReleaseReqNack to the upper order server to refuse returning of the address block. As a result, the address block transfers to the Retrieval Failure state (Tr36). Similarly, when the Deprecating state has persisted for a pre-set time, the own server sends ReleaseReqNack to the upper order server to refuse the returning of an address block, with the address block then transferring to the Retrieval Failure state (Tr37).

When ReleaseRequest is received from an upper order server such that returning of an address block is requested, the own server returns ReleaseReqAck to the upper order server by way of an acknowledgement response, at the same time as the own server sends ReleaseRequest to the lower order server to request an address block to be returned, with the address block keeping its Deprecating state (Tr38). On the other hand, if the ReleaseRequest is received from other than an upper order server, the own server returns ReleaseRequestNack to the server to refuse the returning of the address block, with the address block keeping its Deprecating state (Tr39).

If the own server receives ReleaseReqAck from a lower order server, the timer setting is elongated, with the address block keeping its Deprecating state (Tr40).

TABLE 10

| event | processing contents | next state |
|---|---|---|
| own server receives Release from lower order server | own server sends Release to upper order server | Null state |
| own server completes IP address recovery from client set | own server sends Release to upper order server | Null state |
| own server receives ReleaseReqNack from lower order server | own server sends ReleaseReqNack to upper order server | Retrieval Failure state |
| pre-set time elapses | own server sends ReleaseReqNack to upper order server | Retrieval Failure state |
| own server receives ReleaseRequest from upper order server | own server sends ReleaseReqNack to upper order server and sends ReleaseRequest to lower order server | Deprecating state |
| own server receives ReleaseRequest from other than upper order server | own server sends ReleaseReqNack to requesting server | Deprecating state |
| own server receives ReleaseReqAck from lower order server | own server elongates timer setting | Deprecating state |

The processing sequence for automatic address management according to the present invention in a case wherein the events of network addition, network deletion, migration and re-addressing occur on the Internet is hereinafter explained.

1. Network Addition

Here, a case wherein a smallest network management unit is newly connected to a core portion of a system-wide network, such as Internet. The smallest network management unit is hereinafter abbreviated to "management unit"

Figure 2:
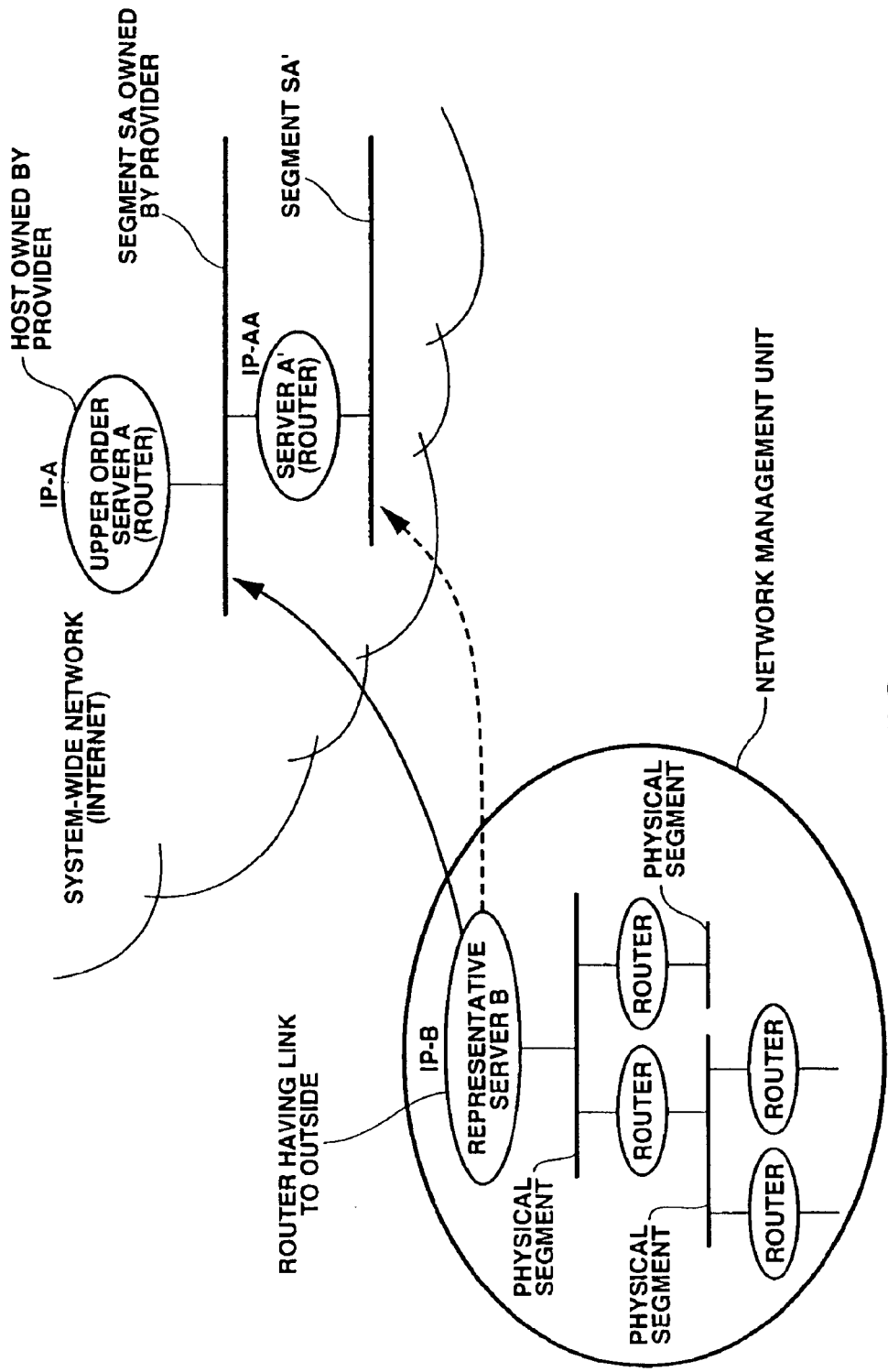
FIG. 2 schematically shows how a network management unit is newly connected to a system-wide network, such as Internet.

FIG. 2 shows the manner in which a new network management unit is newly connected, that is added, to a system-wide network.

This network management unit is a terminal portion of the system-wide network. As shown, the network management unit is made up of a router having an link to outside, referred to below as "representative server", and a physical segment connected to this router. Alternatively, the network management unit is made up of a router as a representative server having a link to outside, one or more other routers and plural physical routers interconnected by the respective routers. The system-wide network is a network which has grown to a global scale network by repetition of interconnections of a large number of physical segments by routers, that is the Internet.

To each segment constituting the system-wide network, there are connected plural hosts, not shown. The router also operates as a so-called "server". On the system-wide network, the relation of upper/lower order pertinence is established from the standpoint of address allocation, as discussed above. The hosts other than routers also operate as clients. In FIG. 2, the segment is of a picture pattern simulating the Ethernet, only by way of illustration.

In the example shown in FIG. 2, network addition is realized by connecting a representative server B of a network management unit to a segment SA supervised by a provider permanently installed on the system-wide network. Since the server A pertains to the core portion of the system-wide network, an IP address "IP-A" is already allocated. It is however noted that the destination of connection of the representative server B is not limited to the segment SA connected to the server A. For example, the destination of connection may also be another segment connected to the segment SA through a server A' (router). In such case, the server A' is a lower order server for the server A, that is a lower order server which has an address block allocated from the upper order server A. The server A' is assumed to have its own IP address "IP-AA". In the following explanation, IP-A may read IP-AA. Of course, a segment, not shown, connected to the segment SA' through another router, may be a destination of connection of the representative server B.

In the present embodiment, address allocation at the time of network addition is classified into the address allocation phase in the network core portion and into the address allocation phase in the network terminal portion. As a presupposition for initiating the address allocation phase in the terminal portion, the IP address (IP-A) of the server A is notified to the representative server B.

First, the representative server B acquires its own IP address to implement its link for outside to the system-wide network. This is provisionally termed "IP-B". The representative server B registers its IP address as an identifier for the server A which is the most adjacent upper order server lying on the connected physical segment SA.

The IP-B address for the representative server may be set manually or automatically in the core portion of the system-wide network. An example of setting an IP address automatically is the DHCP described above. In this case, the DHCP server needs to be present on a segment to be connected to the representative server B. Another example of setting the IP address automatically is the IPCP (Internet Protocol Control Protocol). The IPCP is a network control protocol in case of using TCP/IP (Transmission Control Protocol/Internet Protocol) in accordance with the PPP (Point-to-Point Protocol) and is provided in a well-known manner in RFC (Request For Comments) 1332.

The representative server B then requests the server A, as its directly upper order server, to get an address block allocated to it for use in its own network management unit supervised by itself. This allocation request is made by the representative server B of the network management unit returning an allocation request message described above to the server A as the upper order server.

If the upper order server A which has received the allocation request message owns an address pool, that is an address block of a sufficient large size in the Free state, the upper order server A returns a message "Alloc" meaning address block allocation to the representative server B as its lower order server to complete the address block allocation processing in the core portion.

Figure 3:
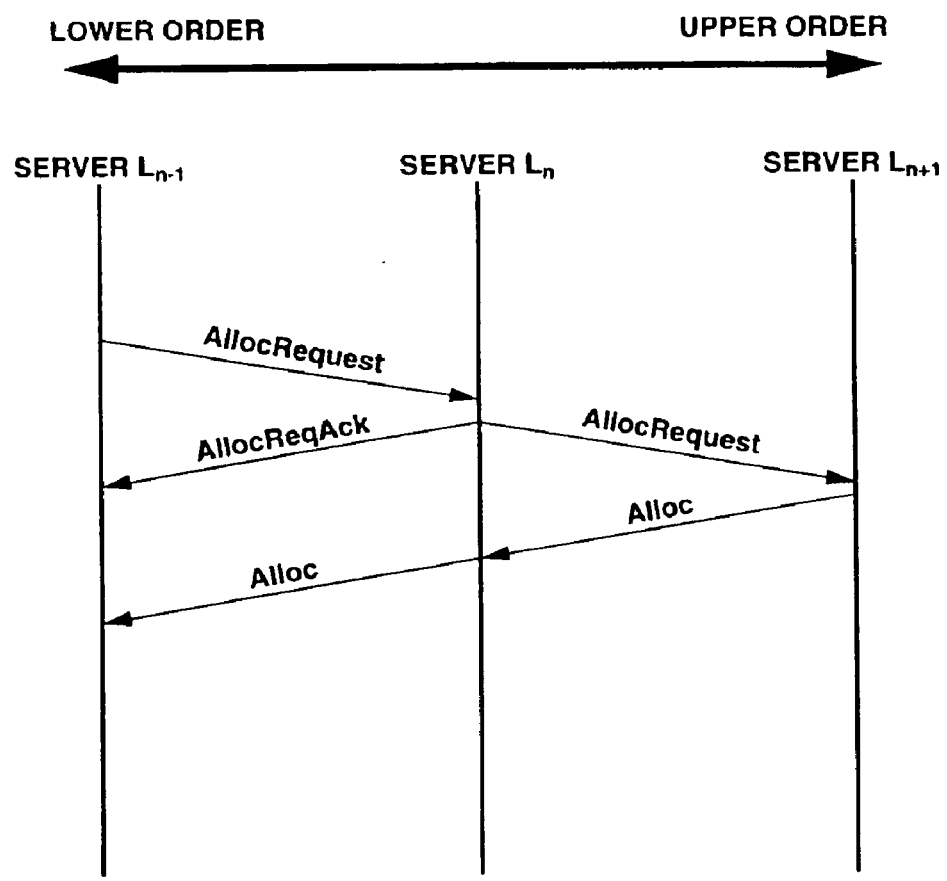
FIG. 3 is a chart schematically showing a recursive handshake procedure for network addition" employing the AllocRequest and AllocReqAck.

If conversely the upper order server A fails to own an address block of a sufficient large size in the Free state, the upper order server returns an acknowledgement response "AllocReqAck" to the lower order server A, at the same time as it returns an address allocation request message "AllocRequest" to its directly upper order server. The handshaking procedure by the AllocRequest and AllocReqAck messages is recursively executed towards further upper order servers until a desired address block is acquired. FIG. 3 schematically illustrates the recursive handshaking procedure employing AllocRequest and AllocReqAck.

If the representative server B has acquired an address block through a link for outside, it proceeds to address allocation in the terminal portion, that is in the network management unit.

In the small-scale network management unit, addresses may be allocated automatically to each host in the unit by applying the DNCP (Dynamic Network Configuration Protocol) explained in the column of Related Art. That is, the upper order server sequentially splits the address block for allocation to lower order servers to achieve efficient automatic address allocation.

2. Network Deletion

Next, a case wherein a network management unit located at a terminal portion is severed, that is deleted, from the core portion of the system-wide network, such as Internet, is explained.

Figure 4:
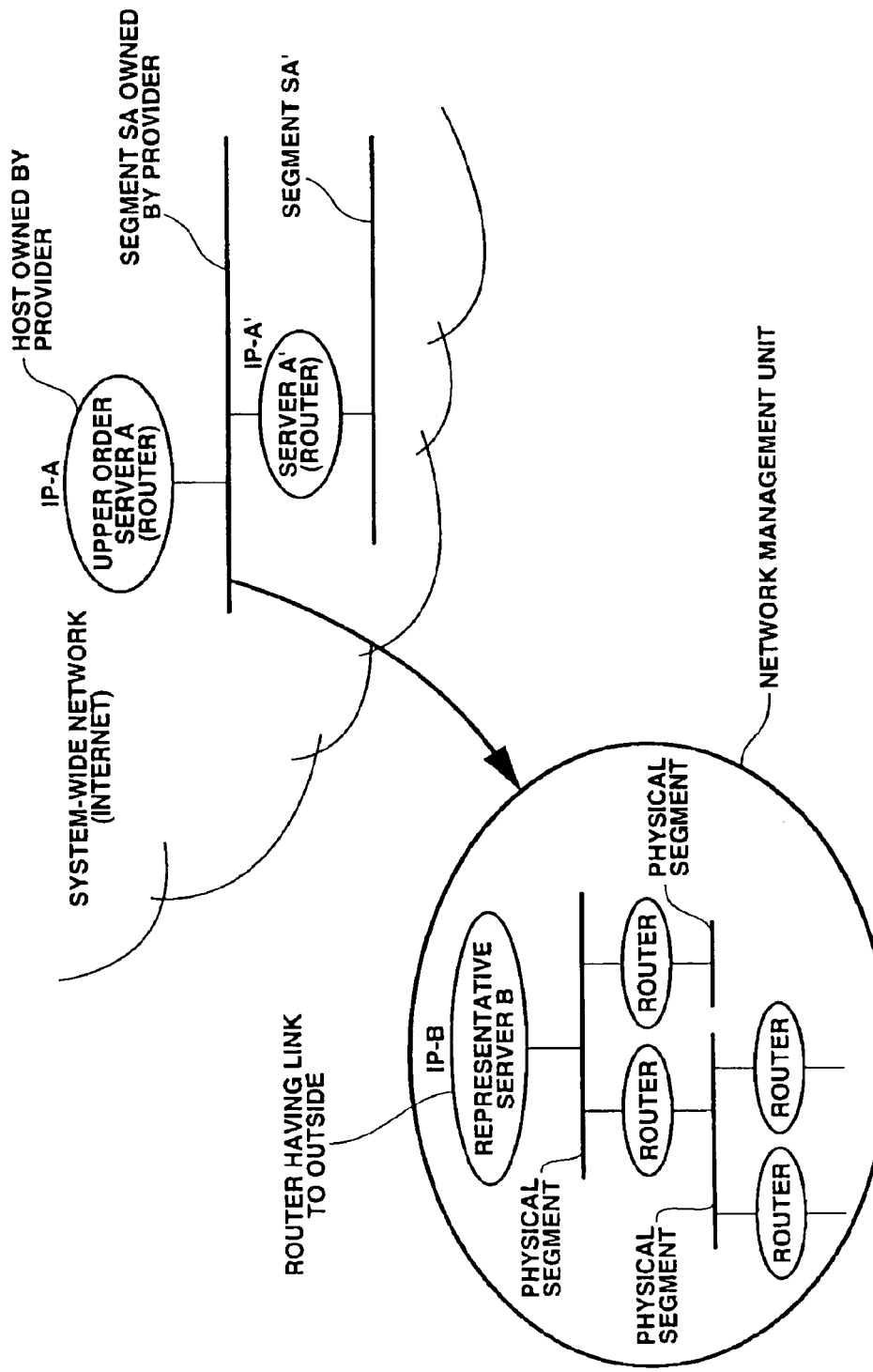
FIG. 4 schematically shows how a certain network management unit is severed from a system-wide network such as Internet.

FIG. 4 schematically shows the manner in which a network management unit is severed, that is deleted, from the system-wide network, such as Internet. The deleted network management unit is located at a terminal portion of the system-wide network and has a router B having a link for outside as a representative server. This representative server B is severed from the segment SA of a provider present in the core of the system-wide network by way of network deletion. In the segment SA, address management is performed by the router A as the upper order server.

In the network deletion, there may be such a case in which a preparatory period is provided such as when a network is severed after advance notice from a network management unit, specifically, its representative server B, and such a case in which the network management unit is abruptly physically severed from the network management unit without advance notice.

The former case of deleting the network after advance notice is explained. It is assumed in the present embodiment that a message "Migrate" requesting network migration and a message "MigrateAck" as an acknowledgement response message to this request are additionally defined.

In the system-wide network, messages are periodically sent by all servers to respective directly upper order servers.

It is assumed that a representative server B located on the lower order side of the server A has previously notified deletion, that is disconnection of the network management unit. This advance notice is realized by the representative server B transmitting a network migration message Migrate to the upper order server A.

In such case, the upper order server A returns an acknowledgement message MigrateAck. The upper order server A then requests returning of the entire address blocks previously allocated to the lower order server B. Thus returning request is made by transmitting the above-mentioned return request message "ReleaseRequest". The lower order server B returns an address returning message "Release" to return the address block which has been in use. The lower order server B is not permitted to be arbitrarily separated from the system-wide network until this address returning procedure comes to a close.

Figure 5:
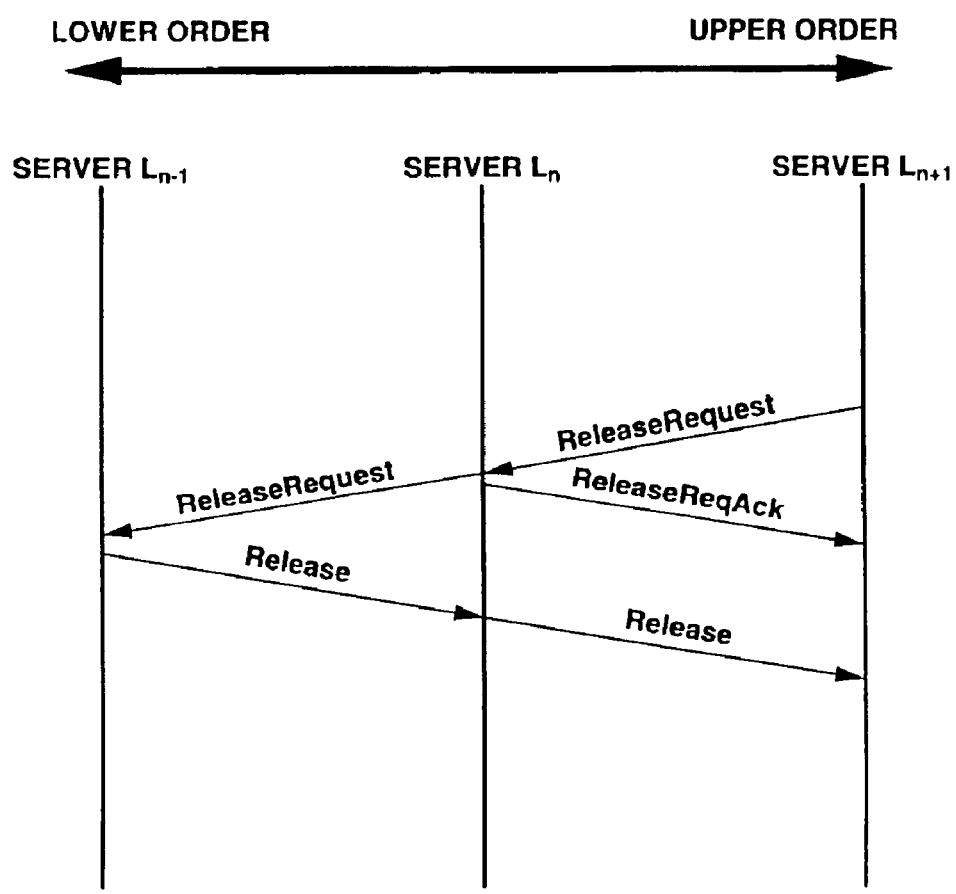
FIG. 5 is a chart schematically showing a recursive handshake procedure for "network severing" employing the AllocRequest and AllocReqAck.

If the representative server B allocates an address block requested by the upper order server A to be returned, that is the address block allocated by the upper order server A, to a further lower order server, the representative server B returns an acknowledgement response message "ReleaseReqAck" to the return request "ReleaseRequest" from the upper order server, whilst transmitting an address return request "ReleaseRequest" to further lower order servers. The handshaking procedure by the ReleaseRequest and ReleaseReqAck messages is recursively executed towards further lower order servers until reaching the lower order server to which has been allocated the address block requested to be returned. FIG. 5 schematically illustrates the recursive handshaking procedure employing ReleaseRequest and ReleaseReqAck.

Such a case in which the network management unit is abruptly physically severed from the network management unit without advance notice is now explained.

In such case, the messages periodically transmitted by the lower order server B cease to be served. The network manager, such as a provider or upper order national or territorial NIC, detects network deletion by such failure to receive these periodic messages. The non-presence or deletion of networks without advance notice may be detected by the time elapsed since the final access from the lower order server.

In such case, a network supervisor recovers the address block manually or automatically.

3. Network Migration

A case wherein a network management unit at a terminal portion of a system-wide network, such as Internet, migrates from its core portion, is explained.

76.

Figure 6:
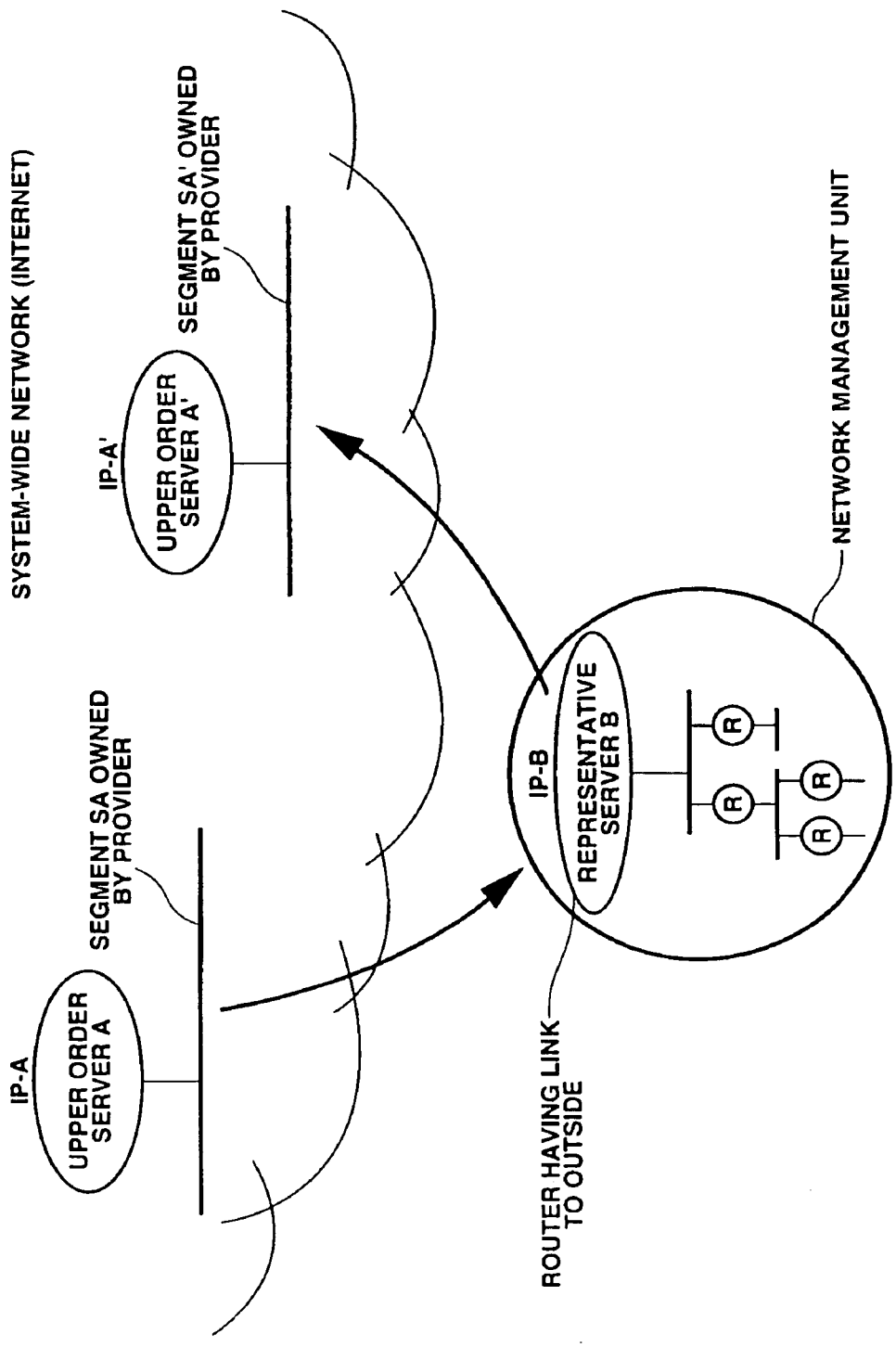
FIG. 6 schematically shows how a certain network management unit is moved in a system-wide network such as Internet.

FIG. 6 schematically shows the manner in which, in a system-wide network, such as Internet, a network management unit changes its access point, that is, migrates. The migrating network management unit is located at a terminal portion of the system-wide network and has a router B having a link for outside as a representative server. It is assumed that the segment SA to which this representative server B has been connected and the segment SA' to which the representative server B is about to be connected are at the core portion of the system-wide network. The segment SA' as a destination of migration may be the same provider as the original segment or a different provider.

Similarly to the network deletion, the network migration may occur after advance notice from the network management unit, more specifically, its representative server B, or without such advance notice.

First, a case wherein network migration occurs after advance notice is explained. In the present embodiment a message requesting network migration "Migrate", and an acknowledgement response message to this request "MigrateAck" as an acknowledgement response message to this request, are additionally defined, as described above.

That is, the representative server B located as a lower order server to the server A sends the network migration request message Migrate to make advance notice for the upper order server A. The upper order server A returns the acknowledgement response message "MigrateAck".

The upper order server A then requests the returning of the entire address block allocated to the lower order server B. This return request is made by transmitting a return request message "ReleaseRequest". The lower order server B is responsive thereto to send an address return message "Release" to return the address block in use, as described above.

The lower order server B is not permitted to be separated from the system-wide network until the address returning procedure comes to a close. If the lower order server B is separated from the system-wide network before completion of the address returning procedure, the upper order server processes in the same way as when the network migrates without advance notice, as will be explained subsequently.

Figure 7:
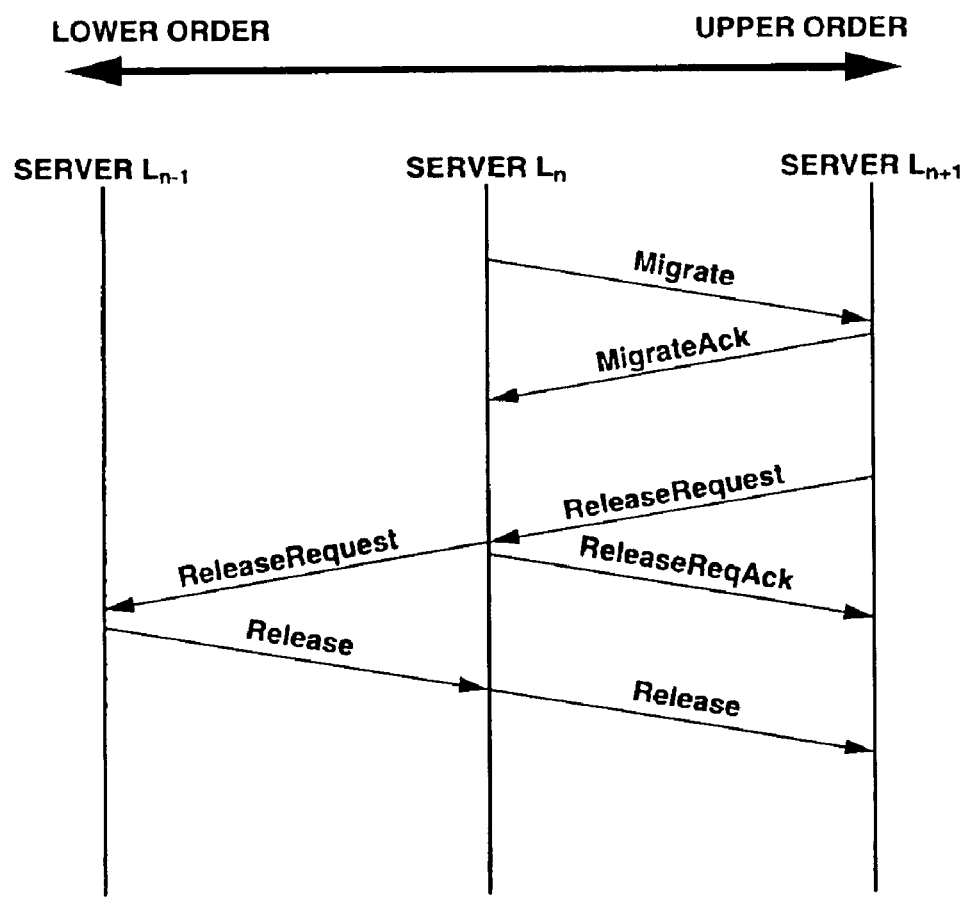
FIG. 7 is a chart schematically showing a recursive handshake procedure for "network migration" employing the AllocRequest and AllocReqAck.

If the representative server B allocates the address block requested to be returned by the upper order server A, that is the address block allocated by the upper order server A, to further lower order servers, the representative server B returns an acknowledgement response message "ReleaseReqAck" to the return request from the upper order server "ReleaseRequest", at the same time as it sends an address return request "ReleaseRequest" to the further lower order servers. The handshaking procedure by the ReleaseRequest and ReleaseReqAck messages is recursively executed towards further lower order servers until reaching the lower order server to which has been allocated the address block requested to be returned. FIG. 7 schematically illustrates the recursive handshaking procedure employing ReleaseRequest and ReleaseReqAck.

After the end of the separating processing in the system-wide network, the representative server B makes connection for the segment SA' managed by another upper order server A' to realize the network migration. The representative server B requests allocation of a new address block for the new upper order server A'. The representative server B requests allocation of a new address block to the new upper order server A'. The connection processing for the segment SA' is substantially the same as the "network addition" described above and hence is not explained specifically.

A case of effecting network migration without advance notice from the lower order server B is explained. This is substantially the same as the case where there is advance notice except that the notice for migration is sent after end of network migration, that is after end of connection to the next segment SA'.

The representative server B sends a migration notice message to the original upper order server A from the segment of destination SA'. The upper order server A which has received this message sends a return request message ReleaseRequest to the representative server B in an attempt to recover the allocated address block.

On the other hand, the representative server B requests allocation of a new address block to the new upper order server A'. However, the connection processing for the segment SA' is substantially the same as "network addition" and hence is not explained specifically.

4. Re-Addressing

In re-addressing of IP addresses, there are a case wherein a network supervisor gives a command to a route server for initiating the re-addressing, and a case wherein re-addressing is automatically initiated when the condition provided at the outset in a server as a management policy of a supervisor is met.
88.

The former case corresponds to a case wherein IP addresses need to be changed as a result of changing of the Internet service provider, or to a case wherein the lower limit of the IP address utilization rate as set by the supervisor is surpassed and hence the utilization rate is raised by the garbage collection of the address block. Conversely, should the upper limit of IP address utilization rate is surpassed, an address pool needs to be replenished in advance in order to cope with an allocation request from the client or the lower order server.

This re-addressing is performed by transmitting the return request message ReleaseRequest for the entire address block from the upper order server to the lower order server.

In the lower order server which has received the ReleaseRequest, the address block is in shortage as a result of returning the address block. Therefore, the lower order server newly requests address block allocation, as a result of which an address block different from the address block previously allocated is allocated to effect re-addressing.

Figure 8:
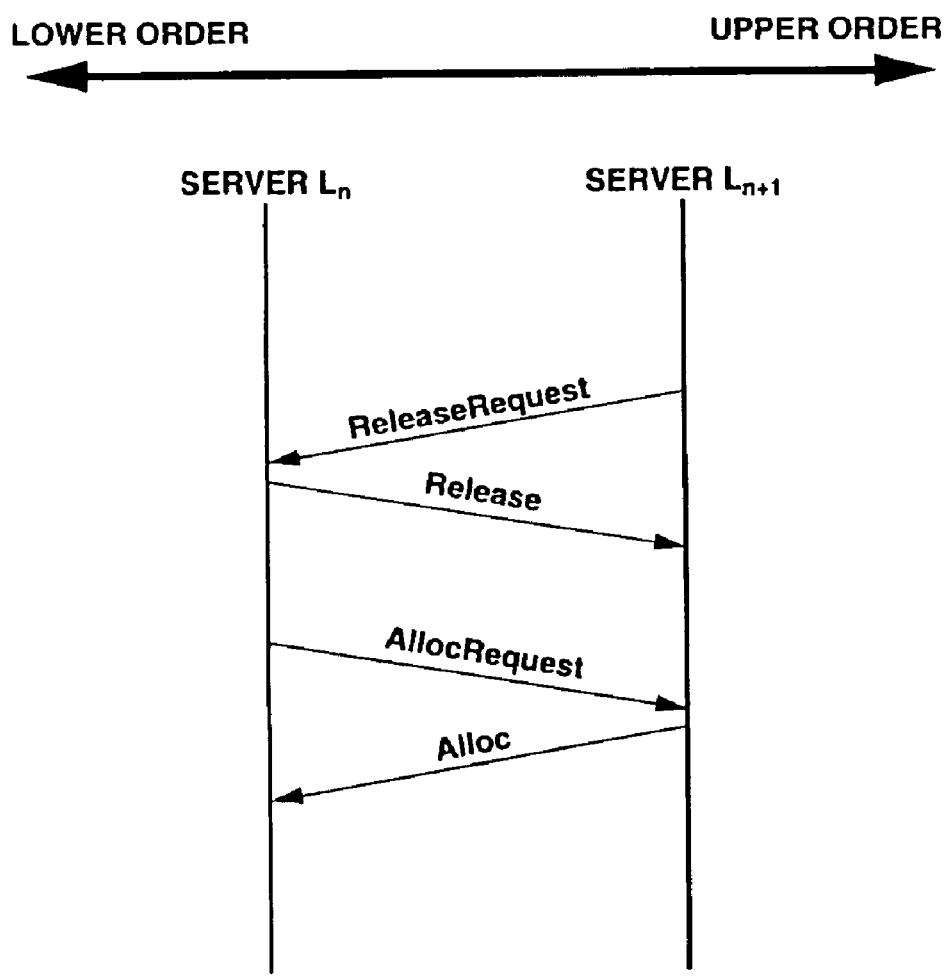
FIG. 8 is a chart schematically showing a recursive handshake procedure for "re-addressing".
Figure 12:
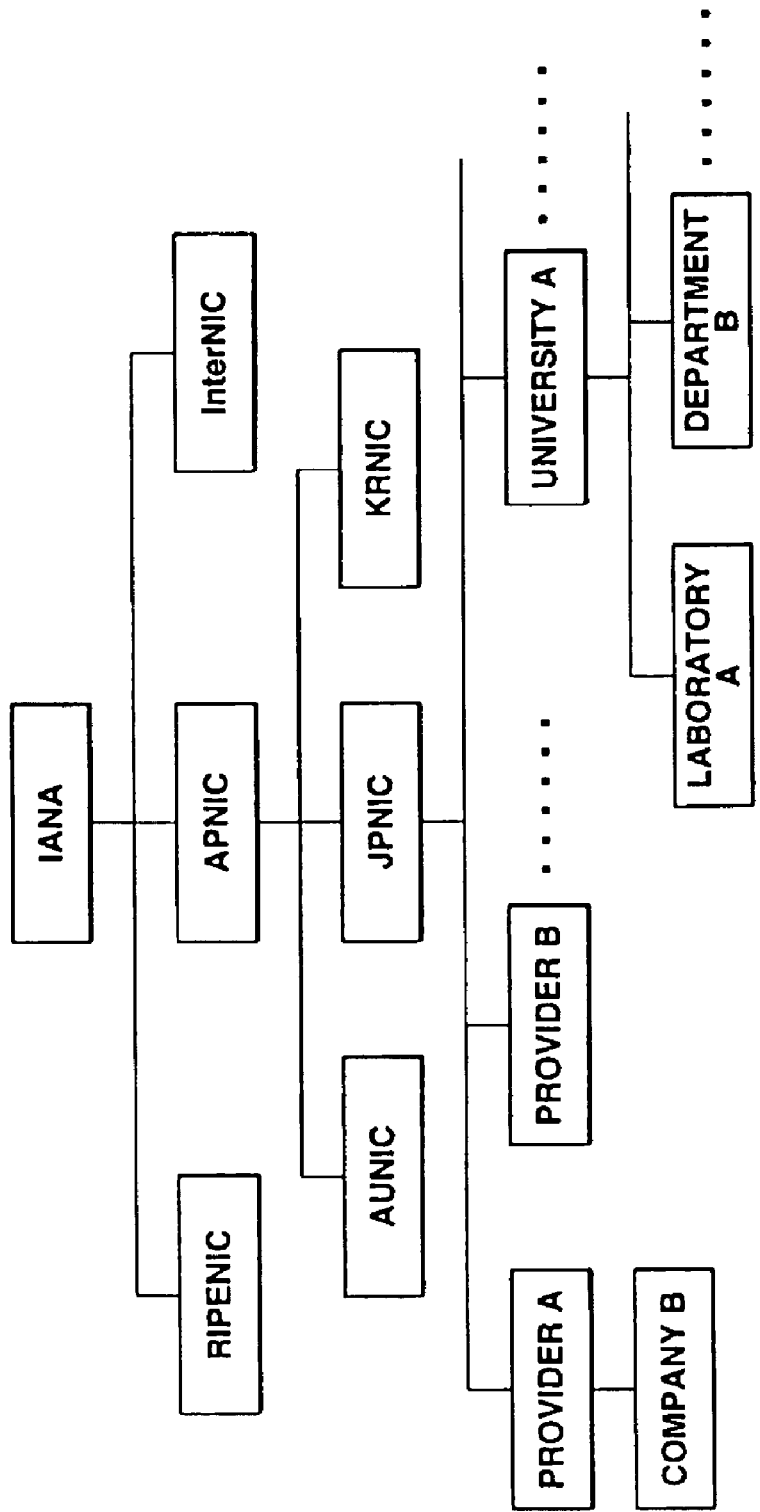
FIG. 12 hierarchically shows the relation among respective servers on the Internet from the standpoint of management and allocation of IP addresses.

FIG. 8 schematically illustrates the handshaking procedure performed between the upper order server and the lower order server in order to perform "re-addressing". The handshaking, that is message exchange, pertinent to address block request or allocation, may be recursively performed across plural upper and lower order servers.

Addition of Authentication Mechanism

In the present embodiment, messages shown in Table 1 have been defined for implementing the dynamic network configuration. However, for prohibiting unauthorized IP address acquisition by a server or a client, it is desirable that processing is carried out after authentication of the received message.

The authentication is performed on the host basis, such as on the server-to-server or server-to-client basis. A server or a client, which has received a message, is to process only a message authenticated in success, while discounting a message if it has failed in authentication.

As identifiers for authentication, a MAC (Media Access Control) address and an IP address are used in the terminal and core portions of the network, respectively. For authentication, a well-known authentication mechanism of the co-owned confidential key system, termed HMAC MD5/****/ is used. To this end, a 16-octet field for setting authentication data has been added to each message for a server tree structure function, a network setting function and a host setting function. FIGS. 9 to 11 schematically show a data structure of each such message.

In sending a message, the authentication information is necessarily attached. First, the Message Digest field in each message is initialized with zero and a pre-set co-owned encryption key is added forwardly of the message to be transmitted.

Then, hash values are computed using, for example, HMAC MD5. The hash values computed are inserted as authentication information in the Message Digest field and transmitted.

If a message is received, Message Digest is re-calculated and confirmation is given when the re-calculated Message Digest coincides with the received Message Digest. A server tree structure which has not been recognized correctly is discarded without being processed further.

Addition of Policing Mechanism

A policing mechanism has a role of checking whether or not the lower order server is utilizing more IP addresses than is necessary to correct address allocation as appropriate.

The policing mechanism in the terminal network portion is implemented by the following procedure:

Step 1

Each server periodically inquires into the address block allocation rate to lower order servers. The authentication information is appended in the same way as in the server tree structure message.

Step 2

The lower order server on reception of the inquiry authenticates the message. If the authentication is done in success, the address allocation with authentication information attached thereto is returned. If the authentication has failed, the message is discounted.

Step 3

Each server authenticates the received response message. If the authentication failed, the message is discarded.

Step 4

In each server is set a lower limit value (Lower Water Mark) of the address block allocation rate in the lower order server. If the response from the low exceeds this lower limit value, the address block is recovered. For recovery, a request message ReleaseRequest is used. In this case, a specified address block may be explicitly designated, or simply the address volume desired to be returned may be designated.

The address block allocation factor is computed in accordance with the following equation:

$$\frac{\text{total number of } IP \text{ addresses of address blocks allocated to the lower order server}}{\text{total number of } IP \text{ addresses of entire address blocks held by a certain } DNCP \text{ server}}$$

In the core network portion, policing may be executed in the same sequence as above.

Moreover, in the terminal network portion, the IP address to each client is checked from one sub-net to another. The IP address allocation rate is found from the following equation:

$$\frac{\text{total number of clients in subnet}}{\text{total number of IP addresses included in address block allocated to the subnet} - 2}$$

In the above equation, 2 is subtracted from the denominator to eliminate the number corresponding to the number of the broadcast address (with the total number of bits in a host portion of the IP address being 1) and to the number of a subnet address, with the total number of bits in a host portion of the IP address being 0.

If the IP address allocation rate is lower than the lower limit value as set by a supervisor, re-addressing is made to a smaller address block. If conversely the upper limit value is exceeded, re-addressing is made to a larger address block.

Annotation

****: HMAC (Hashed based Message Authentication Code) is an algorithm for generating a message authentication code for falsification detection. The RFC 2403, 2404 specifically provide a method for mounting MD5 (Message Digest Algorithm 5: see RFC1321), which is the hash function, on IPSEC (IP security protocol) the HMAC features further hashing the MAC once prepared by MD5.

Supplement

Although the present invention has been elucidated with reference to specified embodiments, it is obvious that the illustrated embodiments can be modified by those skilled in the art without departing from its scope. The present invention has been explained only by way of illustration and should not be construed in a limiting fashion. In judging the purport of the invention, reference should be had to the statement of the claims.

What is claimed is:

1. An automatic address management method, comprising:
   (a) establishing a fixed address for a core network portion having a predetermined interconnection;
   (b) dynamically connecting a terminal network portion to said core network portion, in which an upper-lower order relation is established such that an upper order server allocates an address block to a lower order server and the lower order server returns the address block to the upper order server;
   (c) establishing a link to said lower order server contained in said terminal network portion to a segment contained in said core network portion;
   (d) requesting allocation of an address block to the upper order server supervising said segment by said lower order lower order server; and
   (e) distributing the address block in said terminal network portion through said lower order server wherein the address block is distributed to said lower order server in said terminal Portion in accordance with DNCP (Dynamic Network Configuration Protocol).

2. The automatic address management method according to claim 1 wherein, in said step (c), said lower order lower order server requests connection using an already known address owned by the upper order server of said segment.

3. The automatic address management method according to claim 2 wherein, in said step (c), said lower order lower order server requests acquisition of its own IP address.

4. The automatic address management method according to claim 3 wherein, in said step (c), an address is automatically allocated to said lower order lower order server in accordance with DHCP (Dynamic Host Configuration Protocol) or IPCP (Internet protocol Control Protocol).

5. The automatic address management method according to claim 1 wherein if, in said step (d), an upper order server receiving an address block allocation request does not own a sufficient address pool, an address block allocation request is recursively issued to a further upper order server.

6. A router system for a network comprising:
   a core network portion with fixed addresses, having a predetermined interconnection to said network;
   a terminal network portion with dynamic addresses, dynamically connected to said core network portion, in which an upper-lower order relation is established such that an upper order server allocates an address block to a lower order server and the lower order server returns the address block to the upper order server; and
   a router, functioning as a lower order server for said terminal network portion; said router comprising:
   (a) connection means through which the lower order server communicates to a segment contained in said core network portion;
   (b) address acquisition means in which said lower order server requests allocation of an address block to an upper order server supervising said segment; and
   (c) address distribution means in which said lower order server distributes an address block in said terminal network portion wherein said address distribution means distributes the address block to the lower order server in said terminal portion in accordance with DNCP (Dynamic Network Configuration Protocol).

7. The router according to claim 6 wherein said connection means (a) requests connection using an already known address owned by an upper order server of said segment.

8. The router according to claim 7 wherein said connection means (a) requests acquisition of an IP address of the order server itself.

9. The router according to claim 8 wherein said connection means (a) has an address of said lower order server automatically allocated in accordance with DHCP (Dynamic Host Configuration Protocol) or IPCP (Internet protocol Control Protocol).

10. The router according to claim 6 wherein, if the upper order server receiving an address block allocation request from said address acquisition means (b) does not own a sufficient address pool, an address block allocation request is recursively issued to a further upper order server.

11. A computer program, furnished on a computer-readable medium, said computer program comprising:
   (a) an executable step for establishing a fixed address for a core network portion with fixed addresses having a predetermined interconnection;
   (b) an executable step for dynamically connecting a terminal network portion to said core network portion, in which an upper-lower order relation is established such that an upper order server allocates an address block to a lower order server and the lower order server returns the address block to the upper order server;
   (c) an executable step for assuring automatic address management when said terminal network portion is connected to said core network portion, wherein the lower order server contained in said terminal network portion connects to a segment contained in said core network portion;
   (d) an executable step for requesting allocation of an address block to the upper order server supervising said segment by said lower order server; and (e) an executable step for distributing the address block in said terminal network portion wherein the address block is distributed to said lower order server in said terminal portion in accordance with DNCP (Dynamic Network Configuration Protocol).

12. The program furnishing medium according to claim 11 wherein, in said step (e), said lower order server requests connection using an already known address owned by an upper order server of said segment.

13. The program furnishing medium according to claim 12 wherein, in said step (c), said lower order server requests acquisition of its own IP address.

14. The program furnishing medium according to claim 13 wherein, in said step (c), an address is automatically allocated to said lower order server in accordance with DHCP (Dynamic Host Configuration Protocol) or IPCP (Internet protocol Control Protocol).

15. The program furnishing medium according to claim 11 wherein if, in said step (d), an upper order server receiving the address block allocation request does not own a sufficient address pool, an address block allocation request is recursively issued to a further upper order server.

* * * * *